US00RE34721E

United States Patent [19]

Thompson

[11] E Patent Number: Re. 34,721

[45] Reissued Date of Patent: Sep. 6, 1994

[54] MANIFOLD FORM ASSEMBLY

[76] Inventor: Gary J. Thompson, 2610 Brookdale, Green Bay, Wis. 54313

[21] Appl. No.: 662,730

[22] Filed: Mar. 1, 1991

Related U.S. Patent Documents

Reissue of:

[64] Patent No.: 4,715,620
Issued: Dec. 29, 1987
Appl. No.: 921,964
Filed: Oct. 22, 1986

[51] Int. Cl.[5] ..... B41L 1/00; B41L 1/20; B41M 5/10

[52] U.S. Cl. ..... 462/18; 462/55; 462/56; 462/17; 462/67; 427/153

[58] Field of Search ..... 462/17, 18, 19, 21, 462/22, 55, 61, 84

[56] References Cited

U.S. PATENT DOCUMENTS

| | | | |
|---|---|---|---|
| Re. 30,041 | 7/1979 | Maalouf . | |
| Re. 30,116 | 10/1979 | Maalouf . | |
| 1,980,318 | 11/1934 | Caton | 462/18 |
| 2,194,670 | 3/1940 | Neu | 462/18 |
| 2,470,586 | 5/1949 | Tathwell | 462/18 |
| 2,802,678 | 8/1957 | Bright . | |
| 2,869,868 | 1/1959 | Martin | 462/67 |
| 3,625,547 | 12/1971 | Burke . | |
| 3,981,523 | 9/1976 | Maalouf . | |
| 4,000,916 | 1/1977 | Lucas . | |
| 4,036,511 | 7/1977 | Maalouf . | |
| 4,121,857 | 10/1978 | Halse . | |
| 4,126,334 | 11/1978 | Van Malderghem . | |
| 4,143,891 | 3/1979 | Neubauer | 427/153 |
| 4,165,101 | 8/1979 | Sternberg . | |
| 4,168,851 | 9/1979 | Halse . | |
| 4,178,018 | 12/1979 | Halse . | |
| 4,407,524 | 10/1983 | Trautlein . | |
| 4,576,399 | 3/1986 | White et al. | 462/17 |
| 4,614,362 | 9/1986 | Breen et al. | 462/55 |
| 4,614,363 | 9/1986 | Breen | 462/56 |

FOREIGN PATENT DOCUMENTS

| | | |
|---|---|---|
| 128558 | 6/1963 | New Zealand . |
| 128915 | 3/1964 | New Zealand . |
| 185282 | 11/1980 | New Zealand . |
| 2085359 | 10/1980 | United Kingdom . |

OTHER PUBLICATIONS

"Flip-N-Rite The Patented Form", *Form* (Feb. 1989), pp. 74–78.

"Transfers Writing Front and Back", *Business Forms, Labels & Systems,* (Jul. 1990), p. 48.

Letter of Mar. 9, 1992 from Gerald E. Linden to Andrew S. McConnell.

Letter of Mar. 6, 1991 from Inform Business Inc.

DaMar Design Invoices No. 02089, 01820 and 01975.

*Primary Examiner*—Paul A. Bell

*Attorney, Agent, or Firm*—Andrus, Sceales, Starke & Sawall

[57] ABSTRACT

A manifold form assembly has a front page and a back page, with each page having image-receiving areas disposed thereon. The front page image-receiving areas are non-overlapping with the back page image-receiving areas. A pressure-sensitive image-transferring system is provided integral with the assembly to transfer pressure-created images formed on the front and back page image-receiving areas. Duplicate front and back pages receive images transferred by the image-transferring system. A stub connects the original pages, the image-transferring system, and the duplicate pages into an integral form assembly.

3 Claims, 2 Drawing Sheets

MANIFOLD FORM ASSEMBLY

Matter enclosed in heavy brackets [ ] appears in the original patent but forms no part of this reissue specification; matter printed in italics indicates the additions made by reissue.

BACKGROUND OF THE INVENTION

This invention relates to business forms, and in particular to a manifold business form which provides a plurality of copies of completed form.

Because of the length and complexity of some business forms, it is sometimes impossible to provide a one-page form containing all the necessary printing and blank areas for completion. This results in such forms being printed in a two-page format. When the two pages of the form are on separate sheets, a standard carbon or carbonless image-transferring system can be used to create multiple copies of each completed page. Upon completion, the copies of each page are joined in sets to provide multiple copies of the original two-page completed document. This construction is cumbersome, and can result in incomplete sets of copies if one of the pages is somehow separated from the set.

Alternatively, the form can be printed so that the two pages are on opposite sides of a single sheet. In the past, one of the necessary steps in completing a form of this type has been to manually place carbon sheets between the sheets of the form to ensure that the images imprinted on the original pages are transferred to the copies. The manual placement of carbon sheets is a messy and awkward process, involving the possibility that the carbon sheets may be incorrectly placed. Such incorrect placement of carbon sheets can result in omission of some or all imprinted information from the copies.

Thus, there is a need for a manifold form assembly which allows use of a two-sided original form without the need for manual placement of carbon sheets when filling out the form.

SUMMARY OF THE INVENTION

In accordance with one aspect of the invention, an integral form assembly is provided with an original front page having at least one image-receiving area, and an original back page having at least one image-receiving area. The image-receiving areas on the front and back pages are disposed so as to be non-overlapping.

In accordance with anther aspect of the invention, a pressure sensitive image-transferring means is provided for transferring pressure-created images formed on the image-receiving areas. The image-transferring means is integral with the form assembly.

In accordance with yet another aspect of the invention, a duplicate front page and duplicate back page are provided. The duplicates pages have image-receiving areas corresponding to those on the original front and back pages, for receiving pressure-created images transferred by the image-transferring means.

In accordance with yet another aspect of the invention, a binder is provided for connecting the front and back pages, the image-transferring means, and the duplicates into an integral form assembly.

The present invention thus provides a manifold form assembly for providing a completed original front page and a completed original back page, and for providing a copy of each on the duplicate front page and duplicate back page, respectively. The front and back pages can be completed, and the copies made, without the need for manual placement of carbon papers.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
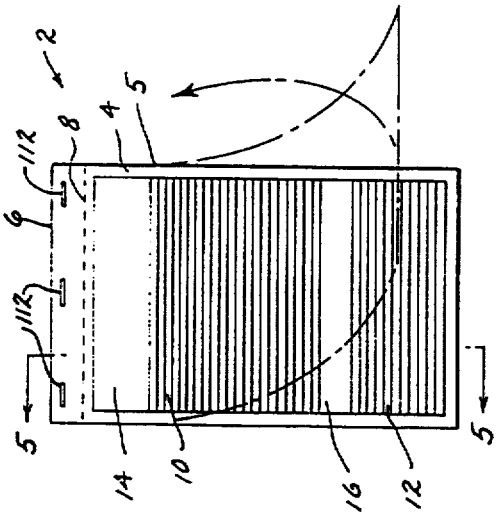
FIG. 1 is a plan view of the manifold form assembly of the present invention with the front page exposed for completion, with phantom lines showing how the front page is moved to expose the back page for completion.

As shown in FIG. 1, a manifold form assembly 2 is provided with an original front page 4 on a first sheet 5 detachably connected to stub 6 along a perforation 8. Front page 4 is a business form having written or printed material thereon, shown at 10, 12. Front page 4 further has blank image-receiving areas 14, 16 to receive pressure-created images formed by writing or typing, for completing front page 4.

Figure 3:
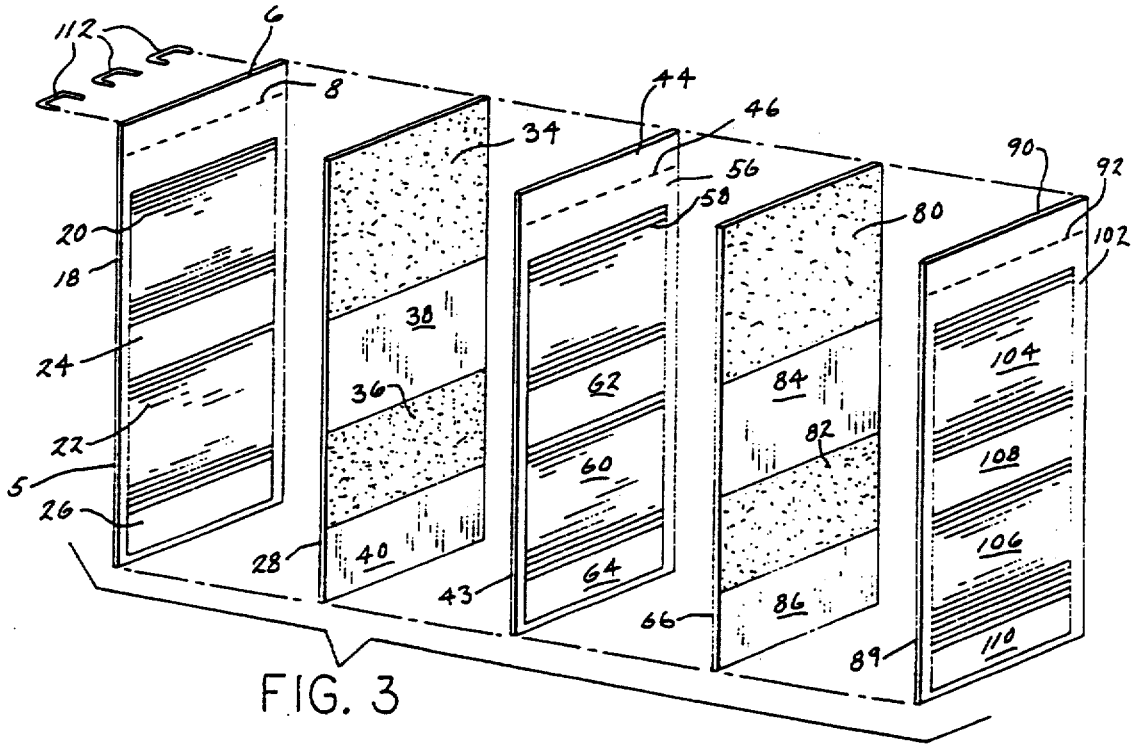
FIG. 3 is an exploded perspective view, showing the back side of the components of the form assembly of FIG. 1.

Referring to FIG. 3, an original back page 18 is provided on the other side of sheet 5. Original back page 18 has areas of written or printed material 20, 22, as well as blank image-receiving areas 24, 26. Back page image-receiving areas 24, 26 are non-overlapping with front page image-receiving areas 14, 16 on the opposite side of sheet 5.

A first carbon sheet 28 is provided directly behind and aligned with sheet 5. The side of carbon sheet 28 adjacent original back page 18 has no exposed carbon areas. As shown in FIG. 3, the other side of carbon sheet 28 is provided with selective pressure sensitive exposed carbon areas 34, 36 and blank areas, 38, 40. Exposed carbon areas 34, 36 encompass and correspond to image-receiving areas 14, 16 on original front page 4, to transfer pressure-created images formed on image-receiving areas 14, 16.

A duplicate front page 42 and a duplicate back page 56 are provided on opposite sides of a duplicate sheet 43, which is positioned behind and aligned with carbon sheet 28. Duplicate sheet 43 is detachably connected to a stub 44 along a perforation 46. Duplicate front page 42 has areas of written or printed material 48, 50, and image-receiving areas 52, 54, which correspond to written or printed areas 10, 12, and image-receiving areas 14, 16, respectively, on original front page 4. Likewise, duplicate back page 56 has areas of written or printed materials 58, 60, and image-receiving areas 62, 64, which correspond to written or printed areas 20, 22, and image-receiving areas 24, 26, respectively, on original back page 18.

A second carbon sheet 66 is provided immediately behind and aligned with duplicate sheet 43. The side of carbon sheet 66 adjacent duplicate sheet 43 is provided with exposed carbon areas 72, 74 and blank areas 76, 78. Exposed carbon areas 72, 74 are disposed on carbon sheet 66 so as to encompass and correspond to image-receiving areas 24, 26 on original back page 18, for transferring pressure-created images formed on image-receiving areas 24, 26. As shown in FIG. 3, the other side of carbon sheet 66 has exposed carbon areas 80, 82 and blank areas 84, 85. Exposed carbon areas 80, 82 encompass and correspond to image-receiving areas 14, 16 on original front page 4, for transferring pressure-created images formed on image-receiving areas 14, 16.

The final sheet in the manifold form assembly is a second duplicate sheet 89, containing a second duplicate front page 88 and a second duplicate back page 102. Duplicate sheet 89 is detachably connected to a stub 90 along a perforation 92. Second duplicate front page 88 has areas of written or printed material 94, 96, and image-receiving areas 98, 100 corresponding to written or printed areas 10, 12 and image-receiving areas 14, 16 on original front page 4. Likewise, second duplicate back page 102 has areas of written or printed material 104, 106, and image-receiving areas 108, 110, which correspond to written or printed areas 20, 22 and image-receiving areas 24, 26 on original back page 18.

Staples 112 or any connecting medium, such as glue, are provided to connect sheets 5, 43, and 89 together at their stubs, to form a composite stub detachably connected to the top edge of each sheet. Carbon sheets 28 and 66 are connected into the composite stub along their top edges by the stapes 112 or other connecting medium. The composite stub acts as a binder, to form an integral form assembly in which each sheet is securely fastened together. Sheets may be removed as desired by detaching the sheet from the assembly at its individual perforation.

Figure 4:
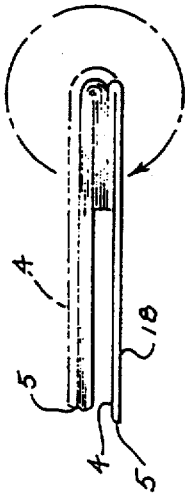
FIG. 4 is a detailed side view of the upper portion of the form assembly of FIG. 1, showing the original back page exposed for completion.

As shown in FIGS. 1 and 4, sheet 5 is movable from a first position in which original front page 4 is exposed, to a second position in which original back page 18 is exposed. The first position is as shown in FIG. 1, where the phantom lines show how sheet 5 is moved to attain the second position. This movement is done manually by the user, after original front page 4 has been filled out. The user lifts sheet 5 and forms a fold at perforation 8, then folds the entire stub over at the perforation 32, 46, 70, and 92. This series of steps places sheet 5 in the second position, in which original back page 18 is exposed for completion, as shown in FIG. 4. When so positioned, original front page 4 is immediately adjacent duplicate back page 102. Sheet 5 is positioned so as to be aligned with each other sheet in both the first and second positions.

Figure 5:
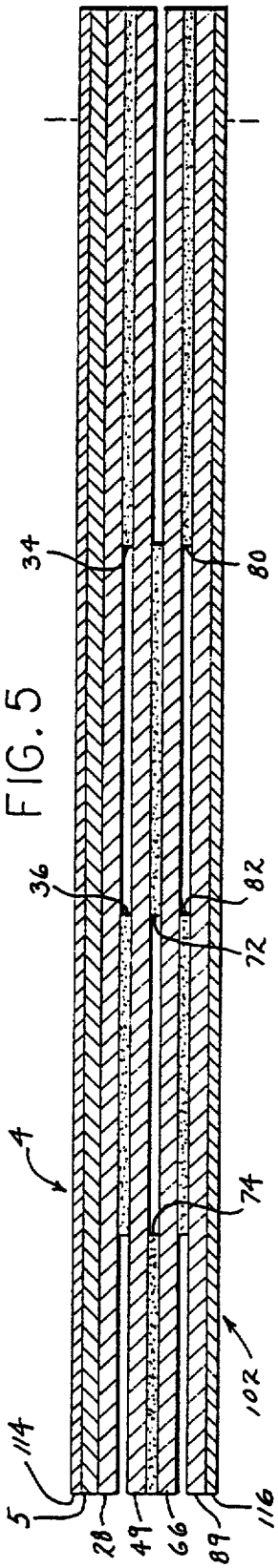
FIG. 5 is a sectional view of the form assembly taken generally along line 5—5 of FIG. 1.

FIG. 5 shows manifold form assembly 2 with the sheet 5 in its first position, wherein front page 4 exposed for completion. As shown in FIG. 5, sheet 5 is a carbonless CB (Coated Back) sheet, meaning that one side is coated with a pressure sensitive carbonless dye 114, as is well known. In typical applications, a CB sheet is positioned so that the dye coating 114 is on the back of the sheet, for transferring images created on the front of the sheet. In form assembly 2, however, CB sheet 5 is placed in the assembly such that dye coating 114 is on the front of the sheet when sheet 5 is in the first position. When so positioned, as shown in FIG. 5, dye coating 114 faces upwardly, and image-receiving areas 14 and 16 receive images formed on original front page 4.

Figure 6:
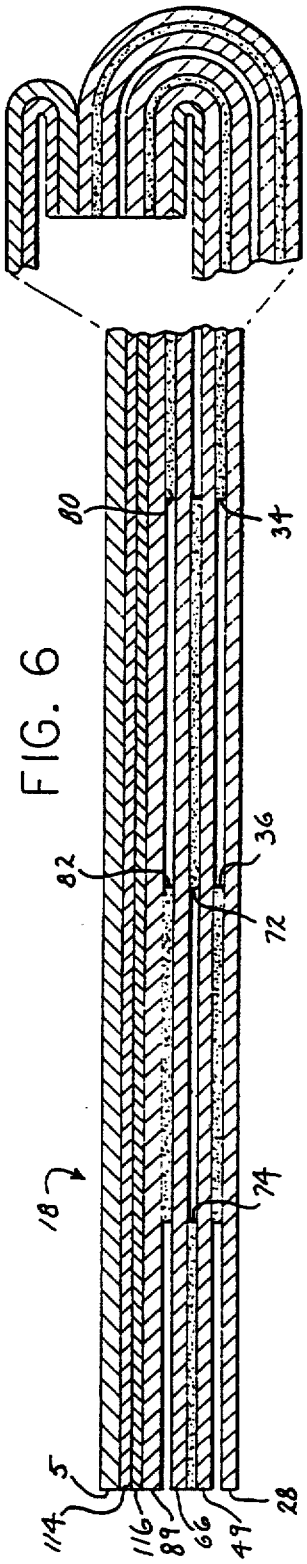
FIG. 6 is a sectional view of the form of FIG. 5, in which the sheet containing the original front and back pages has been flipped to expose the back page for completion.

Second duplicate sheet 89 is a carbonless CF (Coated Front) sheet, meaning that one side is coated with a reactive, image receptive coating 116 to receive images transferred by a pressure sensitive carbonless dye coating, as is well known. When sheet 5 is in its second position, as shown in FIG. 6, the dye coating 114 of CB sheet 5 is placed immediately adjacent receptor coating 116 of CF sheet 89, thus forming a carbonless image-transferring system. Pressure-created images formed on original back page 18 cause dye coating 114 and receptor coating 116 to interact, to transfer pressure-created images formed on image-receiving areas 24, 26 of original back page 18 to image-receiving areas 108, 110 of duplicate back page 102.

It can thus be seen that a two-sided original is provided on sheet 5 by completing original front page 4 with sheet 5 in its first position, then moving sheet 5 to its second position and completing original back page 18. Pressure-created images are transferred from original sheet 5 to duplicate sheets 43 and 89 by carbon sheet 66 and 28, as well as by the carbonless image-transferring system formed by the interaction carbonless dye coating 114 and carbonless receptor coating 116. Copies of the original document of sheet 5 are thus provided on duplicate sheets 43 and 89.

It should be appreciated that the image-transferring function performed by carbon sheets 28 and 66 may also be performed by a carbonless image-transferring system. In such a system, sheets 5, 43, and 89 have selected areas of carbonless CB dye coating and of image receptive CF coating for transferring pressure-created images formed on the image-receiving areas. For example, to transfer images formed on image-receiving area 14 of sheet 5 to image-receiving area 52 of duplicate sheet 43, a CB coating is provided on the back of sheet 5 corresponding to image-receiving area 14 and a CF coating is provided on the front of sheet 43 corresponding to image-receiving area 14. Similarly, a CB coating is provided on the back of sheet 43 and a CF coating on the front of sheet 89, both corresponding to image-receiving area 14, to transfer such images to image-receiving area 98 of sheet 89. Such a carbonless system eliminates the need for carbon sheets 28 and 66.

Figure 2:
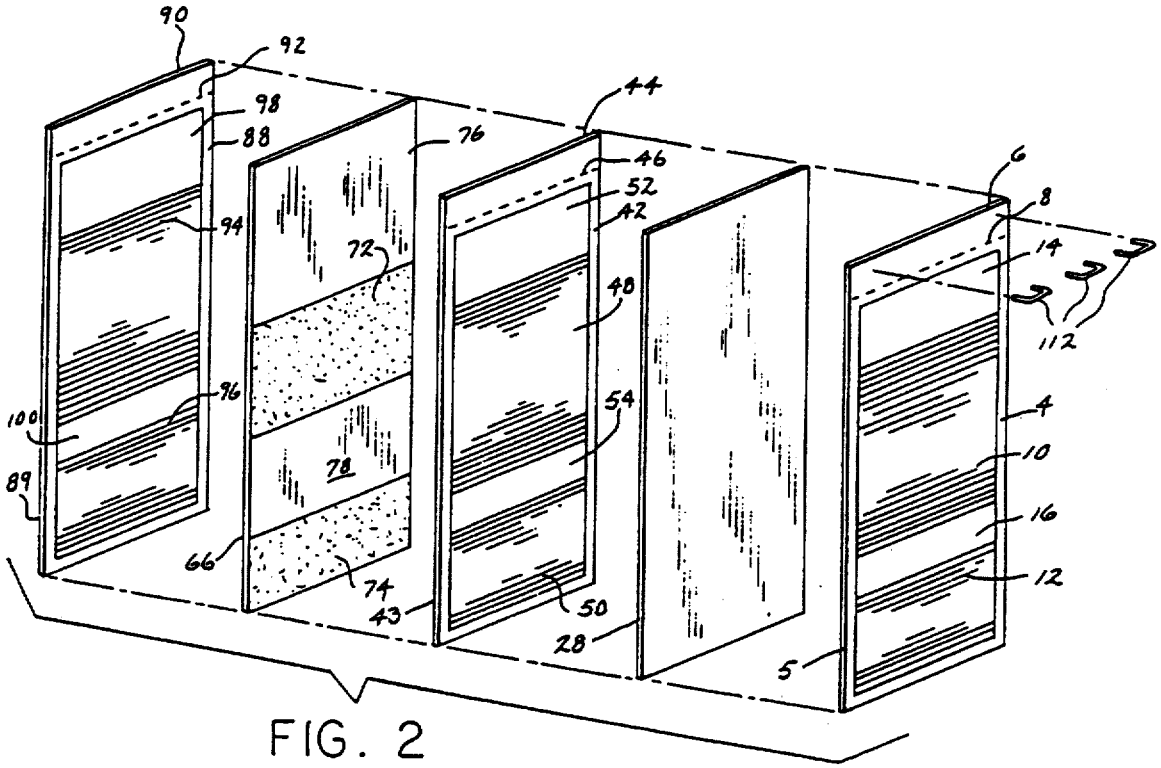
FIG. 2 is an exploded perspective view showing the front side of the components of the form assembly of FIG. 1.

It is also possible to eliminate some components of the form assembly so that it is unnecessary to move any of the sheets to complete the back page. To accomplish this end, the front and back pages to be completed by the user are on separate sheets. Referring to FIGS. 2 and 3, the components eliminated in this arrangement are carbon sheet 28 and duplicate sheet 43. Thus, the necessary elements are first sheet 5, carbon sheet 66, and duplicate sheet 89. Carbon sheet 66 is provided immediately behind and aligned with sheet 5, and duplicate sheet 89 is behind and aligned with carbon sheet 66.

The user first complete original front page 4 of sheet 5 as above, by forming pressure-created images on image-receiving areas 14, 16 of front page 4. The images are transferred to image-receiving areas 98, 100 of duplicates sheet 89 by carbon areas 80, 82 of carbon sheet 66. Then, instead of flipping sheet 5 to expose back page 18 for completion, the user simply flips the entire form over, thus exposing duplicate back page 102 for completion. Duplicate back page 102, being adapted to receive original pressure-created images when so exposed for completion, then essentially becomes the original back page. The user then completes duplicate back page 102 by forming pressure-created images on image-receiving areas 108, 110 of back page 102. The images are transferred to image-receiving areas 24, 26 of original back page 18 by carbon areas 72, 74 of carbon sheet 66. In this manner original back page 18, being adapted to receive pressure-created images transferred by carbon sheet 66, then essentially becomes the duplicate back page.

The original pressure-created images are thus disposed on separate sheets, with the other side of each sheet carrying copies of the original images. This arrangement eliminates the need for providing a carbonless image-transferring system, but is useful primarily when a two-page single-sheet original is not required.

As noted above, the image-transferring function performed by carbon sheet 66 may be performed by a carbonless system. In such a system, sheets 5 and 89 are provided with selected areas of carbonless CB and CF coatings corresponding to the image-receiving areas for transferring pressure-created images formed thereon.

Various modes for carrying out the invention are contemplated as being within the scope of the following claims particularly pointing out and distinctly claiming the subject matter which is regarded as the invention.

I claim:

[1. An integral manifold form assembly for providing a plurality of completed two-page documents, comprising:

an original front page having at least one image-receiving area disposed thereon;

an original back page having at least one image-receiving area disposed thereon, said back page image-receiving area being non-overlapping with said front page image-receiving area when said front and back pages are aligned;

pressure sensitive image-transferring means integral with the form assembly for transferring pressure-created images formed on said image-receiving areas of said original front page and said original back page;

a duplicate of said front page integral with the form assembly and having at least one image-receiving area disposed thereon corresponding substantially to said original front page image-receiving area;

a duplicate of said back page integral with the form assembly and having at least one image-receiving area disposed thereon corresponding substantially to said original back page image-receiving area; and binder means for binding said original front and back pages, said image-transferring means, and said duplicate front and back pages into an integral form assembly, said assembly being adapted for movement between a first position in which said original front page is exposed for completion, and a second position in which said original back page is exposed for completion, so that pressure-created images formed on said original front page image-receiving area when said assembly is in said first position are transferred to said duplicate front page image-receiving area by said image-transferring means, and pressure-created images formed on said original back page image-receiving area when said assembly is in said second position are transferred to said duplicate back page image-receiving area by said image transferring means, for providing a completed original front page and a completed original back page, and for providing a copy of said original front page on said duplicate front page and a copy of said original back page on said duplicate back page.]

[2. The integral manifold form assembly of claim 1, wherein said binder means comprises a stub to which said original front and back pages and said duplicates are detachably connected along an edge thereof.]

[3. The integral manifold form assembly of claim 1, wherein said original front page and said duplicate back page are disposed on opposite sides of a first sheet, and wherein said duplicate front page and said original back page are disposed on opposite sides of a second sheet, and wherein pressure-created images formed on said original front page image-receiving areas when said assembly is in said first position are transferred to said duplicate front page by said image-transferring means, and pressure-created images formed on said original back page image-receiving areas when said assembly is moved to said second position to expose said original back page for completion are transferred to said duplicate front page by said image-transferring means, and wherein said pressure sensitive image-transferring means comprises an image-transferring sheet attached to said binder means and disposed between said first and second sheets, said image-transferring sheet having an image-transferring material disposed thereon.]

[4. The integral manifold form assembly of claim 3, wherein said image-transferring sheet has one side facing said duplicate back page and the other side facing said duplicate front page, and wherein said image-transferring material disposed on said image-transferring sheet comprises a carbon material provided on both said sides of said image-transferring sheet for transferring images from said image-receiving areas of said original front page and said original back page to said image-receiving areas of said duplicate front page and said duplicate back page, respectively.]

[5. The integral manifold form assembly of claim 4, wherein said carbon material provided on said other side of said image-transferring sheet encompasses said original front page image-receiving areas, and said carbon material provided on said one side of said image-transferring sheet encompasses said original back page image-receiving areas.]

[6. An integral manifold form assembly for providing a completed two-sided original document and a completed two-sided copy of the original document, comprising:

an original front page disposed on one side of a first sheet, said original front page having at least one image-receiving area disposed thereon;

an original back page disposed on the other side of said first sheet, said original back page having at least one image-receiving area disposed thereon, said back page image-receiving area being non-overlapping with said front page image-receiving area;

pressure sensitive image-transferring means integral with the form assembly for transferring pressure-created images formed on said original front page image-receiving area and on said original back page image-receiving area;

a duplicate of said original front page disposed on one side of a second sheet integral with the form assembly, said duplicate front page having at least one image-receiving area disposed thereon corresponding substantially to said original front page image-receiving area a duplicate of said original back page disposed on the other side of said second sheet, said duplicate back page having at least one image-receiving area disposed thereon corresponding substantially to said original back page image-receiving area; and binder means for connecting said first and second sheets and said image-transferring means into an integral form assembly, said assembly being adapted to accommodate movement of said first sheet between a first position in which said original front page is exposed for completion and a second position in which said original back page is exposed for completion, said first and second sheets being in substantial alignment when said first sheet is in said first and second positions, so that pressure-created images formed on said original front page image-receiving area are transferred to said duplicate front page image-receiving area by said image-transferring means, and pressure-created images formed on said original back page image-receiving area are transferred to said duplicate back page image-receiving area by said image-transferring means, for providing a completed original front page and a completed original back page on said first sheet, and for providing a copy of said original front page and a copy of said original back page on said second sheet.]

[7. The integral manifold form assembly of claim 6, wherein said image-transferring means for transferring pressure-created images formed on said original front page image-receiving area to said duplicate front page image-receiving area comprises an image-transferring sheet attached to said binder means, said image-transferring sheet having a pressure sensitive image-transferring material disposed thereon for transferring said pressure-created images.]

[8. The integral manifold form assembly of claim 7, wherein said image-transferring material disposed said image-transferring sheet comprises a carbon material provided on said sheet facing said duplicate front page.]

[9. The integral manifold form assembly of claim 8, wherein said carbon material provided on said image-transferring sheet is disposed so as to encompass and correspond to said original front page image-receiving area when said first sheet is in said first position.]

[10. The integral manifold form assembly of claim 6, wherein said image-transferring means for transferring pressure-created images formed on said original back page image-receiving area to said duplicate back page image-receiving area when said first sheet is in said second position comprises a carbonless image-transferring means.]

[11. The integral manifold form assembly of claim 10, wherein said carbonless image-transferring means comprises a pressure sensitive carbonless coating disposed on said original front page and a carbonless receptor means for receiving pressure-created images transferred by said carbonless coating disposed on said duplicate back page, so that when said first sheet is placed in said second position to expose said original back page for completion, and said original front page is thereby placed immediately adjacent said duplicate back page, pressure-created images formed on said original back page image-receiving area are transferred to said duplicate back page image-receiving area by the interaction of said pressure sensitive carbonless coating with said carbonless receptor means in response to the forming of said pressure-created images on said original back page image-receiving area.]

12. An integral manifold form assembly for providing a completed two-sided original document and a plurality of completed two-sided copies of the original document, comprising:

a first sheet having an original front page and an original back page disposed on opposite sides thereof, said front page having one or more image-receiving areas and said back page having one or more image-receiving areas, said front page and back page image-receiving areas being non-overlapping, said first sheet being movable between a first position in which said original front page is exposed for receiving pressure-created images and a second position in which said original back page is exposed for receiving pressure-created images;

a plurality of duplicate sheets aligned with said first sheet, each said duplicate sheet having a duplicate front page and a duplicate back page disposed on opposite sides thereof, with each said duplicate front page and duplicate back page having one or more image-receiving areas substantially corresponding to said original front page and said original back page image-receiving areas, said first sheet and said plurality of duplicate sheets being in substantial alignment when said first sheet is in said first and second positions, said original front page being adjacent and facing *an outermost* one of said duplicate back pages when said first sheet is in said second position;

binder means for connection to said first sheet and to said plurality of duplicate sheets for binding said first sheet and said plurality of duplicate sheets into an integral assembly; and pressure sensitive image-transferring means integral with the form assembly for transferring pressure-created images from said original front page image-receiving areas of said first sheet to said duplicate front page image-receiving areas of said plurality of duplicate sheets when said first sheet is in said first position and said original front page is exposed for receiving pressure-created images, and for transferring pressure-created images from said original back page image-receiving areas of said first sheet to said duplicate back page image-receiving areas of said plurality of duplicate sheets when said first sheet is in said second position and said original back page is exposed for receiving pressure-created images, said image-transferring means comprising:

a plurality of image-transferring sheets attached to said binder means, said image-transferring sheets being disposed in the form assembly so that one said image-transferring sheet is adjacent each said duplicate sheet, said image-transferring sheets having a pressure sensitive image-transferring material disposed thereon for transferring pressure-created images formed on said original front and original back page image-receiving areas to said duplicate front and duplicate back page image-receiving areas on said duplicate sheets when said first sheet is in both said first and second positions; and a pressure sensitive carbonless [image-transferring means disposed between said original back page and the adjacent duplicate back page for transferring pressure-created images from said original back page of said first sheet to the adjacent duplicate back page when said first sheet is in said second position] *coating disposed on said original front page and a carbonless receptor means for receiving pressure-created images transferred by said carbonless coating disposed on said outermost duplicate back page so that when said first sheet is placed in said second position pressure-created images formed on said original back page image-receiving areas are transferred to said outermost duplicate back page image-receiving areas by the interaction of said pressure sensitive carbonless coating with said carbonless receptor means in response to the forming of said pressure-created images.*

13. The integral manifold form assembly of claim 12, wherein said pressure sensitive image-transferring material disposed on said image-transferring sheets comprises a carbon material disposed on each side of said image-transferring sheets, said carbon material being disposed on one side of said image-transferring sheets so as to encompass and correspond to said original front page image-receiving areas for transferring pressure-created images from said original front page image-receiving areas to said duplicate front page image-receiving areas of said duplicate sheets when said first sheet in said first position, said carbon material disposed on the other side of said image-transferring sheets so as to encompass and correspond to said original back page image-receiving areas for transferring pressure-created images from said original back page image-receiving areas to said duplicate back page image-receiving areas of said duplicate sheets when said first sheet is in said second position.

[14. The integral manifold form system of claim 12 wherein said pressure sensitive carbonless image-transferring means comprises a pressure sensitive carbonless coating disposed on said original front page and a carbonless receptor means for receiving pressure-created images transferred by said carbonless coating disposed on said duplicate back page to which said original front page is adjacent when said first sheet is in said second position, so that when said first sheet is placed in said second position pressure-created images formed on said original back page image-receiving areas are transferred to said duplicate back page image-receiving areas by the interaction of said pressure sensitive carbonless coating with said carbonless receptor means in response to the forming of said pressure-created images.]

*15. An integral manifold form assembly for providing a completed two-sided original document and one or more completed two-sided copies of the original document, comprising:*

*a first sheet having a front surface and a back surface, the front and back surfaces having one or more non-overlapping image-receiving areas disposed thereon, the first sheet being movable between a first position in which its front surface is exposed and a second position in which its back surface is exposed;*

*one or more duplicate sheets underlying the first sheet and each having a front surface and a back surface, the front surface of a first duplicate sheet located immediately adjacent the first sheet facing the back surface of the first sheet when the first sheet is in its first position, and the back surface of an outermost duplicate sheet facing the front surface of the first sheet when the first sheet is in its second position, each duplicate sheet having front and back surface image-receiving areas substantially corresponding in location to the first sheet front and back surface image-receiving areas, and wherein the first sheet and the one or more duplicate sheets are in substantial alignment when the first sheet is in its first and second positions;*

*an carbon image-transferring sheet disposed between the first sheet and the first duplicate sheet, the image-transferring sheet having a front surface and a back surface and having image-transferring material on its back surface for transferring images from the front surface of the first sheet to the front surface of the first duplicate sheet when the first sheet is in its first position;*

*a first carbonless coating disposed on the front surface of the first sheet and a second carbonless coating disposed on the back surface of the outermost duplicate sheet for transferring images from the back surface of the first sheet to the back surface of the outermost duplicate sheet when the first sheet is in its second position; and*

*binder means for binding the first sheet, the one or more duplicate sheets, and the image-transferring sheet together for accommodating movement of the first sheet between its first and second positions, so that pressure-created images formed on the first sheet front surface are transferred to the first duplicate sheet front surface by the image-transferring sheet when the first sheet is in its first position, and pressure-created images formed on the first sheet back surface are transferred to the outermost duplicate sheet back surface by the first and second carbonless coatings when the first sheet is in its second position for providing a completed original document on the first sheet and a copy of the completed document on at least one duplicate sheet.*

* * * * *

UNITED STATES PATENT AND TRADEMARK OFFICE

CERTIFICATE OF CORRECTION

PATENT NO. : Re.34,721

DATED : September 6, 1994

INVENTOR(S) : GARY J. THOMPSON

It is certified that error appears in the above-identified patent and that said Letters Patent is hereby corrected as shown below:

On the title page, item

[56] References Cited: Delete "2,869,868" and insert -- 2,869,898 --.

CLAIM 15, Col. 10, Line 23, before "image-transferring" delete "carbon"; CLAIM 15, Col. 10, Line 26, after "having" insert -- carbon --.

Signed and Sealed this

Thirty-first Day of October 1995

*Attest:*

Bruce Lehman

BRUCE LEHMAN

*Attesting Officer*

*Commissioner of Patents and Trademarks*